(12) United States Patent
Figiel et al.

(10) Patent No.: US 7,033,526 B2
(45) Date of Patent: Apr. 25, 2006

(54) FIRE RETARDANT FOAM AND GEL COMPOSITIONS

(75) Inventors: Edmund W. Figiel, Ringoes, NJ (US); Robert E. Byrne, Solebury, PA (US); John E. Orloff, Lawrenceville, NJ (US); David R. Nass, Bridgewater, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/932,454

(22) Filed: Sep. 2, 2004

(65) Prior Publication Data

US 2005/0127338 A1      Jun. 16, 2005

Related U.S. Application Data

(62) Division of application No. 09/938,452, filed on Aug. 24, 2001, now abandoned.

(51) Int. Cl.
- C09K 21/10 (2006.01)
- C09K 21/14 (2006.01)
- A62C 2/00 (2006.01)
- A62C 3/02 (2006.01)
- A62C 3/07 (2006.01)

(52) U.S. Cl. .............. 252/601; 252/603; 252/607; 252/2; 252/8.05; 169/45

(58) Field of Classification Search ........... 252/601, 252/602, 603, 605, 606, 607, 608, 609, 610, 252/611, 378 R, 2, 3, 4, 7, 8.05; 523/179; 516/102, 104, 105, 106, 107
See application file for complete search history.

(56) References Cited

U.S. PATENT DOCUMENTS

| | | | |
|---|---|---|---|
| 444,831 A * | 1/1891 | Hand | 432/226 |
| 3,635,835 A * | 1/1972 | Peterson | 252/193 |
| 3,758,641 A | 9/1973 | Zweigle | 260/874 |
| 4,110,509 A * | 8/1978 | Roth | 442/71 |
| 4,246,146 A * | 1/1981 | Wood et al. | 524/14 |
| 4,382,884 A | 5/1983 | Rohringer et al. | |
| 4,384,988 A * | 5/1983 | Schoenholz et al. | 252/610 |
| 4,400,480 A * | 8/1983 | Silano et al. | 524/47 |
| 4,424,291 A * | 1/1984 | Leake et al. | 524/47 |
| 4,552,803 A | 11/1985 | Pearson | |
| 4,645,782 A | 2/1987 | Redfam | 523/179 |
| 4,952,615 A | 8/1990 | Welna | 523/179 |
| 4,977,194 A | 12/1990 | Haas et al. | 521/99 |
| 4,978,460 A | 12/1990 | Von Blucher et al. | 252/2 |
| 5,062,996 A * | 11/1991 | Kaylor | 252/610 |
| 5,125,952 A * | 6/1992 | Moore et al. | 71/28 |
| 5,145,673 A | 9/1992 | Koizumi | 424/76.1 |
| 5,169,876 A | 12/1992 | Heitmann et al. | 521/155 |
| 5,190,110 A * | 3/1993 | von Blucher et al. | 169/46 |
| 5,262,454 A | 11/1993 | Leroux et al. | 523/219 |
| 5,434,200 A | 7/1995 | Kolker et al. | 524/35 |
| 5,437,902 A * | 8/1995 | Itoh et al. | 428/68 |
| 5,441,560 A * | 8/1995 | Chiotis et al. | 106/18.12 |
| 5,596,029 A | 1/1997 | Goebelbecker et al. | 523/179 |
| 5,676,876 A * | 10/1997 | Winkler, III | 252/3 |
| 5,767,178 A | 6/1998 | Kolker et al. | |
| 5,830,319 A | 11/1998 | Landin | 162/159 |
| 5,840,822 A * | 11/1998 | Lee et al. | 528/44 |
| 5,849,210 A | 12/1998 | Pascente et al. | |
| 5,858,549 A * | 1/1999 | Kielbania et al. | 428/474.4 |
| 6,251,961 B1 | 6/2001 | Pirig et al. | |

FOREIGN PATENT DOCUMENTS

| | | |
|---|---|---|
| CA | 2134130 | 4/1995 |
| EP | 214422 | 3/1987 |
| EP | 380088 | 8/1990 |
| EP | 0 540 861 A1 | 12/1992 |
| EP | 789068 | 8/1997 |
| EP | 823468 | 2/1998 |
| JP | 56049167 | 5/1981 |
| JP | 59189869 | 10/1984 |
| JP | 61154578 | 7/1986 |
| JP | 86050630 | 11/1986 |
| JP | 62044271 | 2/1987 |
| JP | 62267394 | 11/1987 |
| JP | 63090540 | 4/1988 |

(Continued)

OTHER PUBLICATIONS

"Hot Stuff"; People Jul. 26, 1999.

(Continued)

Primary Examiner—Joseph D. Anthony
(74) Attorney, Agent, or Firm—Charles W. Almer

(57) ABSTRACT

A composition which retards the spread of fire, protects assets at risk from fire damage and emits a material which aids in extinguishing the fire. The composition may be either in the form of a gel or a foam and may be used to protect any sort of object, such as personal property, real property or even humans, from fire. The gel form of the composition contains urea or a urea derivative that retains water and releases $CO_2$ upon heating. In addition, a rheology modifier containing carboxyl groups is also employed. The foam form of the composition contains the urea or urea derivative and the rheology modifier, along with a foam generator such as sodium bicarbonate and citric acid. A method of retarding fire comprises the coating of an item with the fire retardant such that the retardant protects the item from the fire and aids in extinguishing the fire by releasing carbon dioxide.

10 Claims, No Drawings

FOREIGN PATENT DOCUMENTS

| | | |
|---|---|---|
| JP | 1056070 | 3/1989 |
| JP | 2121682 | 5/1990 |
| JP | 3031379 | 2/1991 |
| JP | 3292969 | 12/1991 |
| JP | 4198281 | 7/1992 |
| JP | 92051188 | 8/1992 |
| JP | 94026622 | 4/1994 |
| JP | 7300588 | 11/1995 |
| JP | 8107946 | 4/1996 |
| JP | 2774242 | 7/1998 |
| JP | 2824514 | 11/1998 |
| JP | 11140425 | 5/1999 |
| SU | 1701940 | 12/1991 |
| WO | WO 92/18584 | 10/1992 |
| WO | WO 94/11455 | 5/1994 |
| WO | WO 94/24226 | 10/1994 |
| WO | WO 09/03228 | 1/1998 |
| WO | WO 98/52993 | 11/1998 |

OTHER PUBLICATIONS

Rod Carringer; "Class A Foam Applications"; Firehouse/ Jan. 1999 (p. 72-74).

* cited by examiner

FIRE RETARDANT FOAM AND GEL COMPOSITIONS

This application is a divisional of patent application Ser. No. 09/938,452 filed Aug. 24, 2001, now abandoned.

FIELD OF THE INVENTION

The present invention relates to novel foam and gel compositions for preventing combustion and retarding the spread of fire.

BACKGROUND OF THE INVENTION

Fires destroy billions of dollars of personal property every year. Particularly devastating are wildland/urban interface (WUI) and wildland/suburban interface (WSI) fires which involve the spread of fire from non-populated wildland into populated areas. For example, according to the United States Federal Emergency Management Agency a 1990 wildland fire in California caused 26 deaths, destroyed over 5,000 structures and resulted in over $1.5 billion in damages. The conventional method of combating WUI, WSI and other fires, has been to apply water to the fire. This procedure has, however, often been ineffective because of the problems associated with the use of water. Due to run-off and evaporation, water is not readily retained on surfaces which are on fire or in danger of catching on fire. Further, this procedure is not effective in preventing the spread of fire to assets at risk, such as houses, structures and cars, which are not initially engulfed by the fire.

Other materials, and in particular superabsorbent polymers, have been utilized to attempt to prevent the spread of and combat fires. U.S. Pat. No. 5,849,210 discloses a method of retarding a combustible object from burning comprising applying a mixture of water and a superabsorbent polymer which absorbs at least 20 times its weight in water onto an exposed surface of the combustible object. Superabsorbent polymers do not dissolve well and also swell and impart high viscosity to aqueous mixtures. In addition, superabsorbent polymers are brittle and glassy when dry and generally are more expensive than the corresponding non-crosslinked polymers. As far as fire-fighting substances which do not contain superabsorbent polymers, U.S. Pat. No. 6,251,961 discloses a flame-retardant coating comprising substances which carbonize and form a foam layer in the event of a fire.

While known fire retarding materials provide protection via insulation of assets at risk, no known composition contains a material which provides fire protection/insulation without the use of a superabsorbent polymer and, upon exposure to heat, also releases a material which combats the fire. Consequently, it would be advantageous to provide a flame retardant composition which avoids the disadvantages of superabsorbent polymers, protects items from fire and also releases a substance which contributes to extinguishing the fire. It would be particularly advantageous if this composition could be placed on an asset at risk to be protected in advance of contact between the asset and the fire and remain in place in a condition suitable for preventing the spread of the fire to the asset.

SUMMARY OF THE INVENTION

The present invention provides a composition which retards the spread of fire, protects items from fire damage and emits a material which aids in extinguishing the fire. The composition may be either in the form of a gel or a foam and may be used to protect any sort of object, such as personal property, real property or even humans, from fire. The gel form of the composition contains urea or a urea derivative that retains water and releases $CO_2$ upon heating. In addition, a rheology modifier is also employed. The foam form of the composition contains the urea or urea derivative and the rheology modifier, along with a foam generator such as an acid and base. A method of retarding fire comprises the coating of an item with the fire retardant such that the retardant protects the item from the fire and aids in extinguishing the fire by releasing carbon dioxide.

DETAILED DESCRIPTION OF THE INVENTION

A composition for retarding fire and the spread of fire which may be in the form of a foam or a gel. The composition, either in gel or foam form, may be applied to any combustible item prior to the item's contact with fire in order to prevent the item from burning. The composition may be applied to personal property, real property, or even to humans or clothing. The composition may be utilized to coat wildland areas, such as fields or forests, to prevent the spread of fire to those areas. The composition may also be used to combat WUI and WSI fires by coating assets at risk, such as houses, other structures and cars, that border the wildland areas which are affected by a fire. The composition acts to protect the combustible item by providing insulation from the fire and also by releasing carbon dioxide to aid in extinguishing the fire. In both the foam and gel form, the composition provides the superior protection qualities of good contact with coverage and good vertical adhesion to objects. In addition, the foam version of the composition also provides the added benefit of re-foaming upon exposure to heat.

The fire retarding composition comprises a carbon dioxide releasing component, preferably, but not limited to, a urea or a urea derivative comprising a water soluble agent, that retains water but releases carbon dioxide upon heating. A second component is a rheology modifier. Depending upon the desired consistency, the urea or urea derivative/rheology modifier composition may be diluted with water. Optionally, a foam generator, such as an acid and base, may be added to the composition to provide a foam composition. Also optionally, a synthetic composition, such as polyvinyl alcohol or crosslinked materials may also be added to the composition. In an alternative embodiment, the fire retarding composition comprises an alkali swellable rheology modifier under acidic conditions which is combined with water and treated such that the pH is raised to about 6.5. The composition of this alternative embodiment may be utilized as a fire retarding gel.

The urea or urea derivative of the composition preferably comprises a urea or a (hydroxyalkyl)urea ("HAU"), which is defined as any urea derivative containing at least one urea group and at least one hydroxyl group. Hydroxyalkylureas release carbon dioxide, a well-known fire retardant, upon heating. Upon heating to approximately 130–170° C. and exposure to fire, the carbon dioxide released by the HAU will act as an aid in extinguishing the fire. Generally, hydroxyalkylureas contain at least one urea group and at least one hydroxyl group. Carbons disposed between the hydroxyl and urea groups may be in linear, branched or substituted configuration. The general structure and description of HAU is set out in U.S. Pat. Nos. 5,840,822 and 5,858,549, and those patents are herein incorporated by reference.

Exemplary types of HAU include, without limitation, mono(hydroxyethyl)urea, N,N-bis(2-hydroxyethyl)urea, tetrakis(2-hydroxyethyl)urea, tris(2-hydroxyethyl)urea, N,N'-bis(2-hydroxyethyl)urea, N,N'-(3-hydroxypropyl)urea, N,N'-bis(4-hydroxybutyl)urea, 2-urea-2-ethyl-1,3-propanediol, saccharide ureas, 4,5-dihydroxyethylene urea, or mixtures thereof. Other useful ureas include ureas having bases of ethylene urea. Most preferably, the urea derivative component comprises N,N-bis(2-hydroxyethyl)urea.

A rheology modifier is added to the urea or urea derivative to thicken the composition and give the composition desired rheology. The rheology modifier may be a homopolymer or a copolymer containing a carboxyl group which is capable of building viscosity above pH 6.5. Examples of preferred thickeners include alkali swellable emulsion thickeners and acrylic emulsion thickeners, such as acrylates/steareth—20 itaconate copolymer (STRUCTURE® 2001, National Starch & Chemical Company), acrylates/ceteth—20 itaconate copolymer (STRUCTURE® 3001, National Starch & Chemical Company), and potato starch modified (STRUCTURE® Solanace, National Starch & Chemical Company). Other thickeners which may be employed include, without limitation, starch modified thickeners, alkali swellable emulsion thickeners, specifically those which have an acid pH but become highly viscous when neutralized with a base, poly(acrylic) acid, poly(methacrylic) acid, copolymers of acrylic acid and methacrylic acid, hydrophobically modified alkali swellable emulsions which have a pH adjusted to above 6.5 to activate its thickening mechanism, and mixtures thereof.

A fire retardant gel may comprise either a one or a two-part composition, with one part comprising the urea or urea derivative and the other part comprising the thickener. One example of a gel formulation comprises a mixture of N,N-bis(2-hydroxyethyl)urea and an alkali swellable emulsion thickener, such as STRUCTURE® 2001. The two components may either be mixed together during storage or just prior to application. The components may be mixed together in a ratio of about 1 to 1, but are most preferably mixed together in a ratio of about 1:0.2.

An alternative embodiment of a fire retardant gel formulation may comprise an 8% solution of a rheology thickener, such as STRUCTURE® 2001, in an aqueous base having a pH of no less than 6.5.

In order to form a foam fire retardant a two-part composition having a first part of urea and a second part of a rheology modifier and also containing a base and an acid as a foam generator is provided. Any base, either ionic or molecular, that is capable of building a viscosity above pH 6.5 may be added to the urea or urea derivative. Preferred foam generators include sodium bicarbonate and citric acid, and octenyl succinic anhydride or dodecenyl succinic anhydride modified starches, dextrins and flour. Typical sources for these are cereals, tubers, roots, fruits and legumes. Other sources include corn, potato, peas, sweet potato, banana, barley, wheat, rice, amaranth, arrowroot, tapioca, sago, canna, sorghum, British gums and waxy or high amylose varieties of the above. Other base foam generators may include, but are not limited to, potassium bicarbonate, calcium carbonate, urea-base potassium bicarbonate and potassium chloride, along with an acid. Any surfactant may also be used to generate foam. The two parts are maintained separately from each other and put into contact with each other just prior to application to the item to be protected. One method of applying the foam composition is through a twin tank applicator which maintains the components separately until they are being applied to the item to be protected.

The preferred example of a two-part foam fire retardant composition comprises a first part of N,N-bis(2-hydroxyethyl)urea and sodium bicarbonate in a ratio of about 20:1 to about 1:1, and preferably in a ratio of about 5:1 and a second part of a thickener, such as an acrylic emulsion thickener or alkali swellable emulsion and citric acid in a ratio of about 28:1 to about 1:1 and preferably in a ratio of about 3.5:0.1. The two parts are combined in a ratio of about 1:1 to form the final foam composition. A second preferred example of a foam composition comprises a first part of a 50% solids solution of 3% octenyl succinic anhydride on tapioca dextrin (NSC 78-0624, National Starch and Chemical Company) in hydroxyalkyl urea and sodium bicarbonate. Octenyl succinic anhydride attached to hydroxyl groups is known to be a natural foam generator. The octenyl succinic anhydride modified dextrin may be added as a cold slurry, or it may be batch cooked at about 80° C., held for about 30 minutes and then lowered to room temperature before the sodium bicarbonate is added. The second part of the composition comprises a thickener, such as 8.4% STRUCTURE® 2001 in water, and an acid, such as citric acid. The ratio of thickener to acid in the second part is preferably in the range of about 3.5:0.1. The two parts of the foam are combined in a ratio of about 1:1 to form the final foam composition.

The invention can be further described by the following example.

EXAMPLE 1

Foam and Gel Fire Retardant Compositions were Formulated as Follows

A two-part fire retardant gel was manufactured comprising a first part of 25 mL of 100% HAU and a second part of 25 mL of 8.4% solution of alkali swellable emulsion thickener (NSC STRUCTURE® 2001). The two parts were mixed together in a ratio of about 1:1. The gel was applied to a vertical inclined surface of 22 square inches of ⅝ inch thick pine wood and allowed to stand for ten minutes before igniting.

Likewise, a foam fire retardant gel was manufactured comprising a first part of 25 mL of N,N-bis(2-hydroxyethyl)urea and sodium bicarbonate in a ratio of about 5:1. A second part comprising 25 mL of an 8.4% solution of an alkali swellable emulsion (NSC STRUCTURE® 2001) and citric acid was prepared at a ratio of about 3.5:0.1. The two parts were mixed together and applied to a vertical inclined surface of 22 square inches of ⅝ inch thick pine wood and allowed to stand for ten minutes before igniting.

A third wood surface was provided having no coating and a fourth wood surface was doused with 50 mL of water. Both of these wood surfaces were positioned to a vertical position. A torch having a temperature of approximately 2500° F. was applied to the four wood surfaces. The results are illustrated in Table 1.

TABLE 1

Results of Heat on Gel, Foam and Wood

| Material | Amount Applied to Surface Area | Time of Exposure to Flame | Result | Vertical Adhesion |
|---|---|---|---|---|
| Uncoated Wood | N/A | 0.56 sec. | Smoke, Flame, Burned Wood | N/A |
| Water-Coated | 50 mL | 10 sec. | Scorched Wood, | Poor |

TABLE 1-continued

Results of Heat on Gel, Foam and Wood

| Material | Amount Applied to Surface Area | Time of Exposure to Flame | Result | Vertical Adhesion |
|---|---|---|---|---|
| Wood Gel-Coated Wood | 50 mL | 115 sec. | Smoke, Flame Soft Gel Texture, Wood slightly charred | Very Good |
| Foam-Coated Wood | 50 mL | 180 sec. | Soft Foam Texture, Wood slightly charred | Very Good |

As is clearly illustrated in Table 1, the uncoated wood quickly ignited while the water-coated wood was substantially scorched. However, the wood which was coated with the foam and the gel was only slightly charred and the foam and gel retained their textures and insulating characteristics.

We claim:

1. A method for retarding the spread of fire comprising the step of coating an object with a composition comprising a material which retains an amount of water effective to protect a coated substrate from spread of fire for at least 115 seconds and produces carbon dioxide upon exposure to heat, a rheology modifying agent containing carboxyl groups, optionally a synthetic additive and, optionally a foam generator, wherein the material which produces carbon dioxide comprises at least one (hydroxyalkyl)urea.

2. The method of claim 1, wherein the (hydroxyalkyl)urea comprises mono(hydroxyethyl)urea, N,N-bis(2-hydroxyethyl)urea, tetrakis(2-hydroxyethyl)urea, tris(2-hydroxyethyl)urea, N,N'-bis(2-hydroxyethyl)urea, N,N'-(3-hydroxypropyl)urea, N,N'-bis(4-hydroxybutyl)urea, 2-urea-2-ethyl-1,3-propanediol, saccharide ureas, 4,5-dihydroxyethylene urea, or mixtures thereof.

3. The method of claim 2, wherein the (hydroxyalkyl)urea is N,N-bis(2-hydroxyethyl)urea.

4. The method of claim 1, wherein the rheology modifying agent comprises a copolymer or homopolymer containing a carboxyl group and is capable of building viscosity above pH 6.5.

5. The method of claim 4, wherein at least a portion of the rheology modifying agent comprises acrylic emulsion thickeners, potato starch, starch modified thickeners, polyurethanes, alkali swellable emulsion thickeners, poly(acrylic) acid, poly(methacrylic) acid, copolymers of acrylic acid and methacrylic acid, hydrophobically modified alkali swellable emulsions which have a pH adjusted to above 6.5.

6. The method of claim 5, wherein the hydrophobically modified alkali swellable emulsions are selected from the group consisting of acrylates/stearath-20 itaconate copolymer, and acrylates/ceteth-20 itaconate copolymer and mixtures thereof.

7. The method of claim 5, wherein the composition is in the form of a gel.

8. The method of claim 1, wherein the synthetic additive comprises crosslinked compositions, polyvinyl alcohol, or mixtures thereof.

9. The method of claim 1, wherein the composition is in the form of a foam.

10. The method of claim 9, wherein the foam generator comprises sodium bicarbonate and one or more of citric acid, octenyl succinic anhydride modified starches, dextrins, or gums, dodecynl succinic anhydride modified starches, dextrins, or gums or mixtures thereof.

* * * * *